INVENTOR
J. D. JOHANNESEN

BY R. C. Winter

ATTORNEY

INVENTOR
J. D. JOHANNESEN
BY R. C. Winter
ATTORNEY

Nov. 29, 1960 J. D. JOHANNESEN 2,962,551

SWITCHING CIRCUIT

Filed Jan. 6, 1958 3 Sheets-Sheet 3

INVENTOR
J. D. JOHANNESEN
BY R. C. Winter
ATTORNEY

United States Patent Office 2,962,551

Patented Nov. 29, 1960

2,962,551

SWITCHING CIRCUIT

John D. Johannesen, Morris Plains, N.J., assignor to Bell Telephone Laboratories, Incorporated, New York, N.Y., a corporation of New York Filed Jan. 6, 1958, Ser. No. 707,380

19 Claims. (Cl. 179—15)

This invention relates to electrical transmission circuits and more particularly to transmission circuits including gated signal amplifying means applicable to information handling systems.

Communication networks, as employed in telephone systems, for example, necessarily incorporate components which tend to produce signal losses in transmission. Such losses, of course, must be minimized if satisfactory service is to be maintained. Signal amplification may be utilized to offset the losses, and in long distance wire transmission particularly, signal amplifiers or repeaters have provided a satisfactory solution to the problem. The prior art discloses a variety of unilateral amplifiers suitable for use in such repeater applications.

Telephone transmission systems are basically of two types described generally as two-wire and four-wire systems. The latter provides a distinct transmission path for each direction of transmission, so that in such systems a unilateral repeater amplifier is favored. In two-wire transmission systems, however, intelligence is transmitted in both directions between communicants over the same two-wire path, so that unilateral amplifiers, if utilized in such applications, must be connected in pairs through hybrid coil arrangements to provide a bilateral repeater. Such connections, of course, are not economical of required components.

Another approach to bilateral amplification for two-wire system utilization is to utilize an amplifier inductively coupled to the transmission line so that signals in either direction may be amplified by a single amplifier. Such an arrangement may be warranted for connection of stations in locations separated by appreciable distance, but for "short haul" transmission between stations in the same general locale as in private branch telephone exchange operation, the use of an inductively coupled amplifier in each connecting line would be impractical. Also, on a time division multiplex basis in which a single, common communication link is shared by all stations, such amplification would be ineffective. In the latter instance, the problem is one of location of the amplifier on the common bus. The inductively coupled amplifier permits a form of bilateral amplification in which amplification is effected in the direction in which the signal is proceeding. Thus it may be seen that a signal emanating from one of a first group of stations and proceeding toward one of a second group of stations may be amplified by an intermediately located, inductively coupled amplifier. If, however, the originating and receiving terminals are in the first group of stations, the receiving terminal fails to derive any benefit from the amplifier. Thus, location of such an amplifier on the common bus so that it may amplify signals between any two stations would be impossible.

It is a general object of this invention to provide an improved signal transmission system.

It is another object of this invention to afford a reduction in components without sacrifice of quality in a two-wire voice frequency signal transmission system.

It is another object of this invention to provide an improved two-wire, time division communication system.

More specifically, it is an object of this invention to provide bilateral amplification in the common link of a time division communication system to amplify signals between any pair of a plurality of terminals connected at random to the common link.

It is thus a further object of this invention to provide a completely bilateral signal amplifier.

These and other objects of this invention are attained in specific illustrative embodiments wherein a two-wire, space division, telephone communication system and a time division multiplex communication system include a bilateral amplifier in accordance with the invention.

The basic elements of the space division system are the telephone terminal equipment, two-wire communication channels and switching equipment to connect pairs of terminals to available channels. Each channel in systems of this type, as known in the art, is provided with an arrangement of amplifiers and hybrid coils to amplify signals in either direction. This amplification equipment necessarily is duplicated in the majority of the channels employed to permit maintenance of a proper signal level for every conversation.

In accordance with this invention, a single bilateral gated amplifier may be associated with all of the communication channels in use by connection of a common link between the gated amplifier and consecutively operated channel gates. The inventive circuit comprises an amplifier, sampling gate means for transferring a signal sample from a channel through the associated channel gate during its interval of operation and over the common link to storage means associated with the amplifier, output gate means for transferring the amplified sample back to the sampled channel during the same interval of channel gate operation, and clamping gate means for removing any of the sample remaining in the storage means between intervals of channel gate operation. The sampling gate means are enabled and disabled in consecutive time intervals by a suitable trigger pulse generator such that samples from each channel are independently processed.

More specifically, the sampling gate means is enabled in unison with operation of each of the consecutively operated channel gates, allowing a signal sample to pass through a series resonant circuit, and is disabled when the voltage across the capacitor of the series resonant circuit, representing the signal sample, is a maximum. A high input impedance amplifier is connected across the capacitor, and when the sampling gate means is disabled, the amplifier output is transmitted through the output gate means to the common link. The output gate means is disabled in conjunction with the channel gates, and thereafter, the clamping gate means, connected across the capacitor, is enabled so as to discharge to ground any signal remaining on the capacitor. The gated amplifier is then in condition to receive a signal sample from another channel connecting a pair of terminals in communication.

The sampling technique and bidirectional quality of the amplified signal permit association of a single gated amplifier, in accordance with the invention, with a plurality of communication channels merely by including bilateral gating means in each channel. Such gating means are connected to the input gating means of the gated amplifier over a common link and are enabled sequentially. Due to its unique gating arrangement, the amplifier thus may be shared in time among all of the communication channels.

A time division multiplex transmission system substitutes a single communication link common to all terminals for the large number of channels per pair of terminals in communication in a space division transmission system. Each pair of terminals shares the use of the common communication link by sequential operation of gating means associated with each terminal. A single bilateral amplifier, as known in the art, when associated with the common link in a two-wire system, permits maintenance of proper signal levels between terminals at opposite ends of the common link. However, with terminals connected at random intervals along the common link as indicated in branch exchange operation on a time division basis, the amplifier must be capable of amplification in either or both directions along the common link, regardless of the direction of travel of the original signal. The gated amplifier, in accordance with this invention, satisfies this requirement of completely bilateral amplification. As the amplified signal sample is gated directly to the link without reference to the direction in which the signal is traveling along the link, amplification may occur in either or both directions for every received signal sample. In this embodiment, the gated amplifier has its various gate means operated in conjunction with operation of the terminal gates.

The signal sample required by the gated amplifier to achieve the desired gain in a communication system is only a small fraction of the total signal. Thus another distinct advantage of the invention is apparent. Should a failure occur in a component of the gated amplifier circuit such that the circuit is unable to provide the desired gain, normal transmission will not be disrupted. The transmitted signal, absent the gain from the gated amplifier and reduced by the minute sample withdrawn for its operation, will nevertheless be adequate to provide an acceptable operating level pending correction of the difficulty in the amplifier circuit.

It is a feature of this invention that a communication system comprise a bilateral, gated amplifier common to all communication channels and providing amplification in both directions of transmission, irrespective of the direction of transmission of received signals.

It is another feature of this invention that an amplifier be connected intermittently to a communication medium by means of sequentially operated sampling and output gates.

It is a further feature of this invention that means be included in the gated amplifier circuit for applying to the amplifier a signal at a higher voltage level than the level of a signal received from the transmission medium through the sampling gate.

It is yet another feature of this invention that a resonant circuit including an inductor in series with the sampling gate and the amplifier, and a capacitor in shunt between the inductor and the amplifier being included in the gated amplifier circuit.

It is still another feature of this invention that gating means be provided for discharging the capacitor while both sampling and output gates are disabled.

A complete understanding of this invention and of these and various other features thereof may be gained from consideration of the accompanying drawing, in which.

Figure 1:
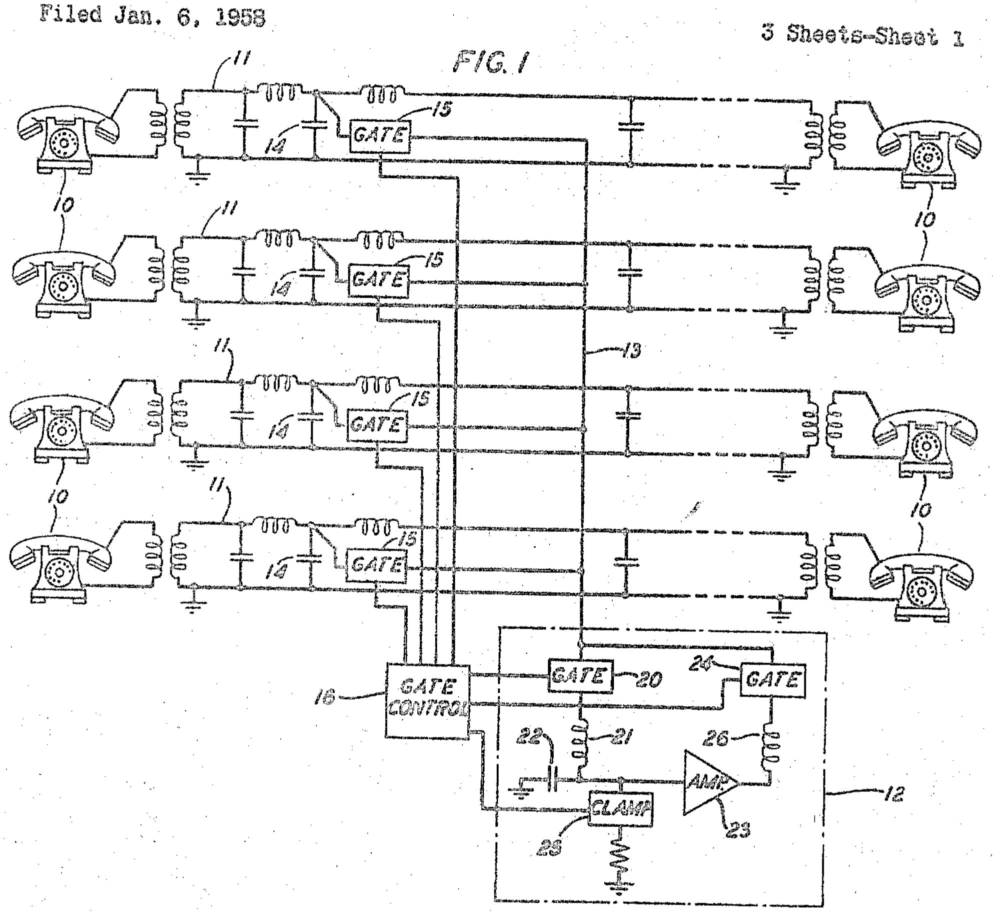
Fig. 1 is a diagrammatic representation of one illustrative embodiment of this invention.

Referring now to the drawing, Fig. 1 depicts a skeleton version of a space devision, voice frequency, telephone communication system comprising a plurality of telephone stations 10 connected in pairs by two-wire, grounded, transmission lines 11. The conventional switching system for interconnecting various of the stations is omitted in this example. A gated amplifier 12, in accordance with this invention, advantageously is connected over common link 13 to a capacitor 14 in each of the transmission lines 11 through a series of gates 15. Gate control circuit 16 applies signals to enable each of the gates 15 in succession, thereby applying successive signal samples stored in capacitors 14 over common link 13 to the gated amplifier 12. Each amplified signal sample is returned to the originating line 11, after which the associated gate 15 is disabled, and another gate 15 is enabled. Thus it is seen that amplification takes place on a time division basis, the single gated amplifier 12 permitting a signal amplification in each of a plurality of active transmission lines 11, thereby substantially reducing required circuit components.

One form of the gated amplifier which facilitates this system operation is illustrated in Fig. 1. It comprises an input or sampling gate 20, a series resonant circuit comprising an inductor 21 and a storage capacitor 22, the amplifier 23, a series inductor 26, an output gate 24 and a discharge or clamping gate 25. Each of the various gates 15, 20, 24 and 25 advantageously may be of a two transistor type having bilateral transmission characteristics as described hereinafter in connection with Fig. 3.

Signal samples to be amplified are supplied through sampling gate 20 which is enabled in unison with operation of each of the transmission line gates 15 by trigger pulses from gate control circuit 16. The sampling gate 20 is disabled when the voltage across the capacitor 22 is a maximum. Theoretically, the action of the series resonant circuit should make the voltage on this capacitor rise to twice the voltage of the signal sample on the common link 13. In operation the voltage does not attain this value due to circuit Q, but a substantial voltage rise is achieved. The amplifier 23, advantageously of a high impedance type, is connected across the capacitor 22, and when the sampling gate 20 is disabled, the output gate 24 is activated to pass the amplifier output at the new voltage level to the common link 13 and from thence to the transmission line 11 which originated the signal. The gate 15 associated with this line is then disabled as is the output gate 24 of the amplifier circuit. Inductor 26 performs an important function known as resonant transfer which will be described in detail hereinafter in connection with Fig. 3. Inductance is required between the amplifier 23 and each line 11 for resonant transfer purposes. An inductor in each line 11 may be utilized, but the single inductor 26, placed as shown, serves equally as well.

Prior to activation of sampling gate 20 for processing of the next signal gated onto the common link 13, any charge remaining on the capacitor 22 from the previous signal sample must be removed. For this purpose clamping gate 25 is activated during an interval while both sampling and output gates 20 and 24 are disabled, thereby discharging to ground the capacitor 22.

Figure 2:
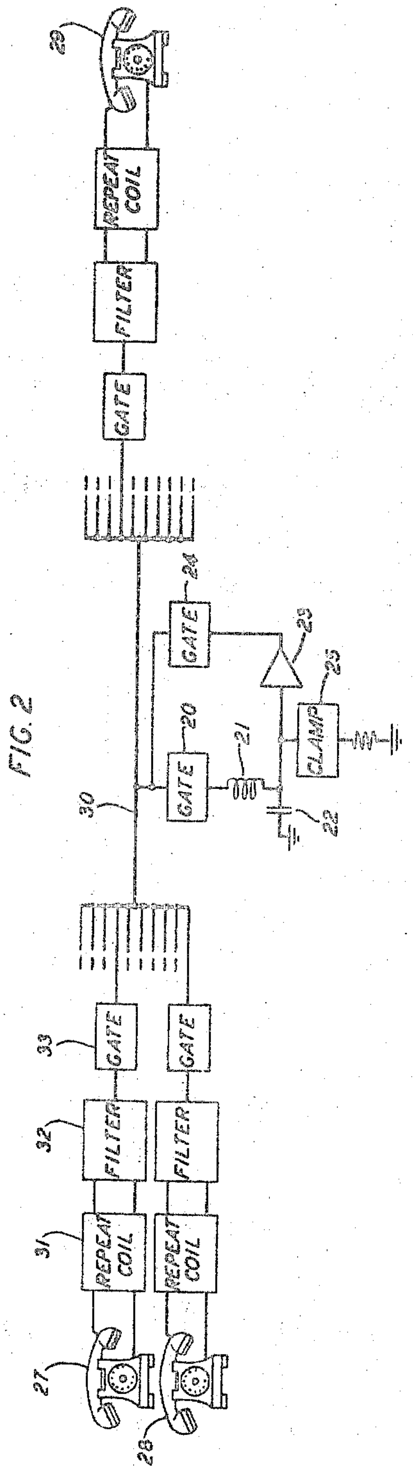
Fig. 2 is a diagrammatic representation of another illustrative embodiment of this invention.

One distinct advantage of the gated amplifier, in accordance with this invention, may be seen in connection with the simple time division multiplex telephone transmission system shown in Fig. 2. The system comprises a plurality of telephone terminals, such as 27 and 28, serving a localized operation and being associated with a remote group of telephone terminals, such as 29, and with each other by a two-wire common communication link 30. The essential circuit elements at each terminal are the repeat coil 31, filter 32 and line gate 33. A pair of active terminals in communication have their respective line gates 33 operated concurrently so that samples of their conversation may be transmitted over the common communication link 30 during a discrete time interval or time slot. Each pair of terminals in communication is assigned a distinct time slot in a cyclically repeated group of time slots, and the samples derived and transmitted during these time slots when properly amplified and filtered, form a clear representation at the receiving end of the transmitted intelligence.

An obvious advantage of time division operation, of course, is the saving in transmission facilities evidenced by the single link 30 rather than a link per active pair of terminals as in the system illustrated in Fig. 1. The fact that only a small portion of the original information is transmitted in such a system accentuates the importance of proper amplification even over short distances as encountered, for example, in communication between two local terminals such as telephones 27 and 28 in Fig. 2.

To assure proper amplification between any two terminals in the system of Fig. 2 by means disclosed in the prior art would require the placement of such means in the link 30 between each pair of terminals, since it is apparent from Fig. 2 that no single location of such amplifying means in the common link 30 can satisfy this requirement. Thus as stations 27 and 29 are in communication, bilateral amplifying means which amplifies in the direction of transmission will serve these stations if connected to the link 30 in the position shown in Fig. 2. However, such means in this position would be useless to assist communication between two local stations such as 27 and 28, since amplification of signals from either local station, if produced at all by such means, would be solely in the direction of the remote stations such as 29.

Location of my novel gated amplifier anywhere along the common link 30, such as in the position shown in Fig. 2, will amplify signals between any pair of stations in communication in the entire time division system. This desirable result is achieved due to the circuit's complete disregard of source or direction of transmission of sampled signals. It will accept signal samples from each active terminal, amplify such signal samples and gate the resultant signals onto the link 30 such that current flows toward both the sending and receiving terminals. The original signal is in effect reduced by the amplified sample transmitted toward the sending terminal and is enhanced by the amplified sample transmitted toward the receiving terminal. Consequently, one gated amplifier in accordance with this invention will provide properly amplified signals to each active receiving terminal in the system irrespective of the signals' origin.

Figure 3:
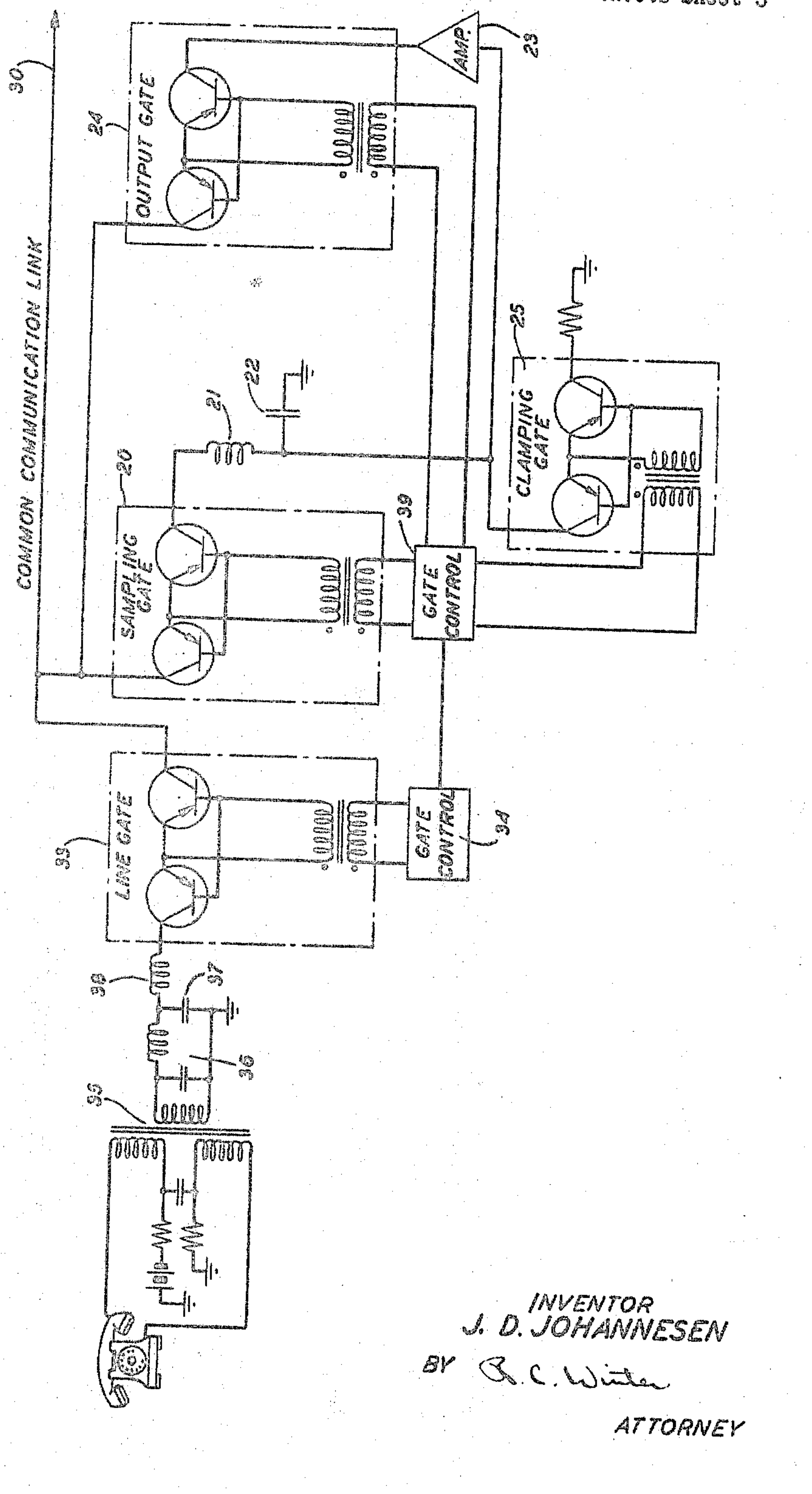
Fig. 3 is a more detailed schematic representation of a portion of the representation of Fig. 2.

Elements of the gated amplifier are shown in some detail in Fig. 3 in connection with one terminal of the time division system illustrated in Fig. 2. The components at the terminal itself include a repeat coil 35, low pass filter 36 terminated in a shunt capacitor 37, resonant transfer inductor 38, and line gate 33. The resonant transfer inductor 38 is inserted to permit virtually lossless transfer of a signal through the line gate 33 during the time slot in which this gate is activated. Such resonant transfer is described by W. D. Lewis in his patent application Serial No. 633,358, filed January 9, 1957, now Patent 2,936,337, issued May 10, 1960.

The function of resonant transfer may be shown in connection with Fig. 3. Line gate 33 and the corresponding line gate at the terminal in communication with this terminal are operated for the interval of one time slot. During this time slot interval, which is established at one half the period of an oscillation of the resonant transfer circuit, the charge on capacitor 37 is transferred through the line gate 33, over the link 30, and through the remote terminal line gate to the equivalent capacitor at the remote terminal. Absent the resonant transfer inductor 38, the capacitor at each terminal would share the charge equally at one half the original voltage, the other one half being dissipated in spark and high frequency oscillation. The inductor assures a virtually lossless transfer of signal through the line gates, the resonant transfer inductor preventing sparking as the gates are activated, and the gates being disabled in one half cycle at the circuit's resonant frequency to prevent a return of the charge to the capacitor from which the signal was transmitted.

A gating circuit which satisfies the requirements in such a system of alternate zero and infinite impedance to current flow in either direction, and thus is suitable for use as line gate 33, is shown in J. D. Johannesen et al., application Serial No. 570,530, filed March 9, 1956, now Patent 2,899,570, issued August 11, 1959. Briefly, it comprises a pair of transistors having common bases and common emitters and a magnetic core coupled to the base and emitter of each transistor. The collector of one transistor is conected to the resonant transfer inductance 38 and the collector of the other transistor is connected to the common link 30. Timed pulses from gate control circuitry are applied to the magnetic core to activate and disable the gate, thus defining the time slot for this terminal.

The sampling gate 20, output gate 24 and clamping gate 25 of the gated amplifier, advantageously are of the same type as the line gate 33, as indicated in Fig. 3. A sample of the signal present on common link 30 is stored in capacitor 22 upon activation of sampling gate 20. The inductor 21 may be located at the input of gate 20 or in the position shown in Fig. 3.

The signal stored on capacitor 22 provides the input to amplifier 23 which may be any type of power amplifier having the requisite high impedance input and low impedance output to provide a strong signal through the output gate 24 at a voltage level above that present on the common link 30 as established by the voltage on capacitor 22. An arrangement of two transistors connected in complementary relationship as an emitter follower may perform the desired amplifying function. The amplifier preferably is direct-current coupled between input and output to avoid storage effects of a transformer coupled configuration which may present some difficulty.

The output gate is activated to return the signal sample in its amplified state to the common link upon disablement of the sampling gate. Subsequently the clamping gate 25 is activated to discharge the capacitor 22 in preperation for receipt of the next signal sample.

Figure 6:
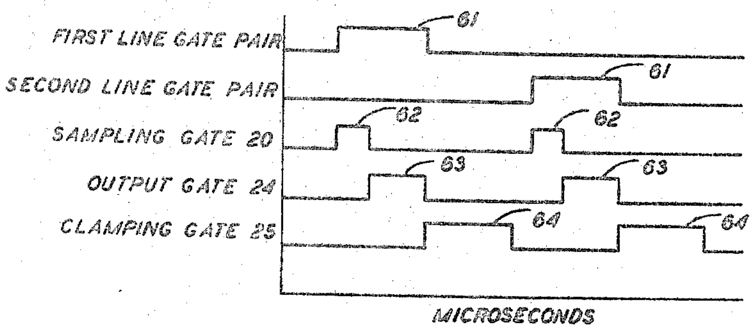
Fig. 6 is a timing sequence chart of the operation of the inventive circuit in accordance with the embodiment shown in Fig. 2.

The particular timing sequence as determined by pulses from gate control 34 and 39 of Fig. 3 is illustrated in Fig. 6. Thus, the line gates associated with a first pair of terminals in communication are activated for the period of a time slot interval 61. Simultaneously, the sampling gate 20 is activated during the interval 62 which is less than the time slot interval 61. The output gate 24 is activated for the balance of the time slot interval upon disablement of the sampling gate 20. A short time later the line gates associated with a second pair of terminals in communication are activated for the period of a second time slot interval 61 and the sequence of amplifier gate operations is repeated. Between time slot intervals 61, the clamping gate 25 is operated during an interval 64 sufficient to remove the signal remaining on the capacitor 22 at the end of the first time slot interval 61.

The length of each interval of gate operation may be varied to suit the requirements of each particular application and gated amplifier configuration. Thus, for example, the sampling interval 62 may be reduced and the output interval 63 increased to occupy the balance of the time slot interval 61. Similarly, the clamping interval 64 may be varied dependent upon the time required for capacitor discharge, and the time slot intervals 61 will be spaced accordingly.

Figure 4:
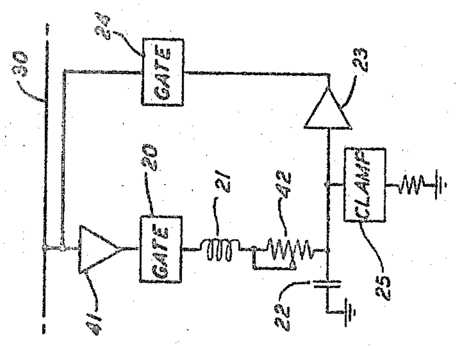
Fig. 4 is a schematic representation of one aspect of the gated amplifier circuit in accordance with the invention.

An alternative arrangement of the gated amplifier is illustrated in Fig. 4. I have observed that when the sampling gate 20, inductor 21 and capacitor 22 are connected to the common link 30 with the output gate 24 removed, the terminal-to-terminal loss of the system may be increased if appreciable energy is drawn from the link in the signal sample. It appears, therefore, that the resonant circuit at the input of the amplifier in this instance lowers the common link voltage, and it may be desirable to place a second amplifier 41 between the common link 30 and the resonant circuit to reduce the drain on the common link 30. Such an arrangement advantageously may increase the overall gain of the system. Variable gain control means 42 may be inserted, as shown in Fig. 4, for proper operation of this arrangement of the gated amplifier.

An alternative to the arrangement shown in Fig. 4 would be to permit variation of the relative values of inductor 21 and capacitor 22 and provision for increased amplification by amplifier 23.

Figure 5:
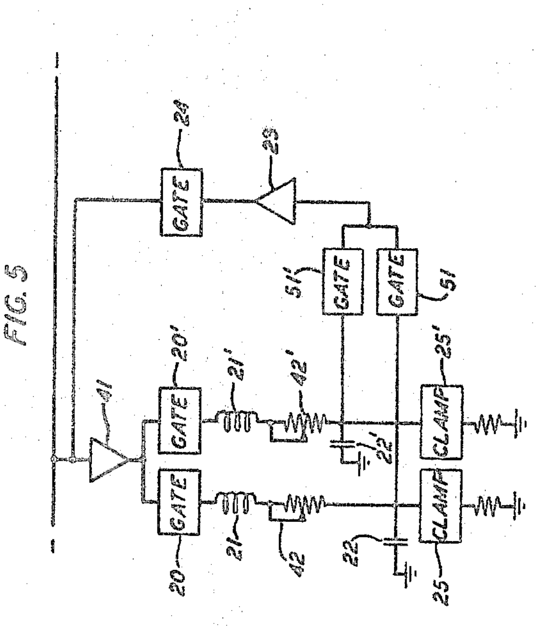
Fig. 5 is a schematic representation of another aspect of the gated amplifier circuit in accordance with the invention.

An increase in the number of terminals in the time division system may necessitate an increase in the number of available time slots in each cycle. A reduction in the clamping interval between time slots would permit this time slot increase, but such a reduction may adversely affect the operation. The arrangement of the gated amplifier illustrated in Fig. 5 permits a commutation of input signals such that clamping gates 25 and 25' are operated in alternate time slots. Thus, in a first time slot, gates 20, 51 and 24 are activated to permit amplification of the signal sample stored in capacitor 22. In a second time slot which may follow the first time slot without an intermediate time interval, gates 20', 51' and 24 are activated to permit amplification of a signal sample stored in capacitor 22'. During this second time slot, clamping gate 25 is activated to remove any residual signal from capacitor 22 remaining from the first time slot. Such an arrangement permits all of the cycling time to be allotted to time slots with no intermediate clamping intervals required.

An alternative circuit arrangement for obtaining amplification in a two-wire transmission system is described by J. O. Edson in this patent application Serial No. 689,857, filed October 14, 1957, now Patent 2,927,967, issued March 8, 1960.

It is to be understood that the above-described arrangements are illustrative of the application of the principles of this invention. Numerous other arrangements may be devised by those skilled in the art without departing from the spirit and scope of this invention.

What is claimed is:

1. Amplifying means coupled in shunt to a signal carrying medium and comprising sampling gate means for sampling the signal on said medium, an amplifier, means coupled to said sampling gate means for applying said signal sample to said amplifier at a higher voltage than that of said signal on said medium, output gate means for applying the output of said amplifier directly to said medium, and means for enabling said sampling gate means during one time interval and said output gate means during a later time interval.

2. Amplifying means coupled in shunt to a signal carrying medium and comprising sampling gate means for sampling the signal on said medium, an amplifier, resonant circuit means coupled to said sampling gate means for applying said signal sample to said amplifier at a higher voltage than that of said signal on said medium, said resonant circuit means including inductive means connected to said sampling gate means and capacitive means connected between said amplifier and ground, output gate means for applying the output of said amplifier to said medium, and means for enabling said sampling gate means during one time interval and said output gate means during a later time interval.

3. Amplifying means in accordance with claim 2 and further comprising means for discharging said capacitive means prior to enablement of said sampling gate means.

4. Amplifying means in accordance with claim 3 wherein said coupling between said amplifying means and said signal carrying medium comprises means connected to the input of said sampling gate means and to said output gate means.

5. Amplifying means in accordance with claim 3 and further comprising inductive means connected to said output gate means.

6. Amplifying means in accordance with claim 3 and further comprising a second amplifier connected between said signal carrying medium and said sampling gate means.

7. Amplifying means in accordance with claim 6 wherein said resonant circuit means comprises gain control means.

8. Amplifying means coupled to a signal carrying medium and comprising a sampling gate, an amplifier, a series resonant circuit comprising an inductor in series with said sampling gate and said amplifier and a capacitor in shunt between said inductor and said amplifier, an output gate for applying the amplifier output to the coupling between said amplifying means and said signal carrying medium, means for discharging said capacitor, and means for enabling said sampling gate, said output gate and said discharging means during consecutive time intervals.

9. In combination a communication medium, a circuit connected in shunt with said medium comprising an amplifier, sampling means including a first input gate for applying a sample of the signal on said communication medium to said amplifier at a higher voltage than that of said signal on said communication medium, an output gate for applying the amplifier output directly to said communication medium, and means for successively enabling said first input gate and said output gate.

10. In combination a communication medium, an amplifier, sampling means for applying a sample of the signal on said communication medium to said amplifier at a higher voltage than that of said signal on said communication medium, said sampling means comprising resonant circuit means including a first input gate, an inductance in series with said input gate and said amplifier and a capacitor in shunt with said amplifier, an output gate for applying the amplifier output to said communication medium, and means for successively enabling said first input gate and said output gate.

11. The combination in accordance with claim 10 and further comprising means for discharging said first resonant circuit capacitor before enablement of said first input gate.

12. The combination in accordance with claim 11 wherein said sampling means further comprises a second input gate having its input connected to the input of said first input gate, a second resonant circuit having an inductance in series with said second input gate and said amplifier and a capacitor in shunt with said amplifier, and further comprising switching means for alternately connecting said first and second input means to said amplifier, and means for discharging said second resonant circuit capacitor before enablement of said second input gate, said enabling means consecutively enabling said first input gate, said output gate, said second input gate and said output gate.

13. In a communication system having a plurality of communication links connected through gating means to a common conducting path, first means for enabling said gating means to apply in succession signals from an ordered grouping of said plurality of communication links to said common path, a circuit connected in shunt with said common path comprising an amplifier, input means comprising an input gate for applying a sample of the signal on said common path to said amplifier at a higher voltage than that of said signal on said common path, output means including an output gate for applying the amplifier output directly to said common path, and second means synchronized with said first means for enabling said input gate during one time interval and for enabling said output gate during a succeeding time interval.

14. In a communication system the combination according to claim 13 wherein said input means comprises an inductor in series with said amplifier and said input gate and a capacitor in shunt with said amplifier.

15. In a communication system having a plurality of communication links connected through gating means to a common conducting path, first means for enabling said gating means to apply in succession signals from an ordered grouping of said plurality of communication links to said common path, an amplifier, input means comprising an input gate for applying a sample of the signal on said common path to said amplifier at a higher voltage than that of said signal on said common path, output means including a gate and series inductor for applying the amplifier output to said common path, and second means synchronized with said first means for enabling said input gate during one time interval and for enabling said output gate during a succeeding time interval.

16. In a time division communication system, a common communcation link, a circuit in shunt with said link comprising an amplifier, input means including an input gate for applying a sample of the signal on said link in a given time slot to said amplifier at a higher voltage than that of said signal on said link, output means including an output gate for applying the amplifier output back to said link in said time slot, and means for enabling said input gate in the first part of said time slot and for enabling said output gate in the last part of said time slot.

17. In a time division communication system, a common communication link, an amplifier, input means including an input gate and a resonant circuit for applying a sample of the signal on said link in a given time slot to said amplifier at a higher voltage than that of said signal on said link, said resonant circuit means including an inductor in series with said input gate and said amplifier and a capacitor in shunt between said inductor and said amplifier, output means including an output gate for applying the amplifier output back to said link in said time slot, means for enabling said input gate in the first part of said time slot and for enabling said output gate in the last part of said time slot.

18. A time division communication system in accordance with claim 17 further comprising means for discharging said capacitor after enablement of said output gate during said time slot and before enablement of said input gate during the next succeeding time slot.

19. In a space division communication system having a plurality of communication channels, gating means in each of said channels, a common conductor connected to each of said gating means, first means for enabling said gating means to apply in succession signals from an ordered grouping of said plurality of communication channels to said common conductor, a circuit connected in shunt with said common conductor comprising an amplifier, storage means comprising a capacitor connected to said amplifier, input means comprising an input gate for applying a sample of the signal on said common conductor to said storage means, output means including an output gate for applying the amplifier output to said common conductor, and second means synchronized with said first means for enabling said input gate during one time interval and for enabling said output gate during a succeeding time interval.

References Cited in the file of this patent

UNITED STATES PATENTS

| | | |
|---|---|---|
| 2,221,452 | Lewis | Nov. 12, 1940 |
| 2,490,833 | Ransom | Dec. 13, 1949 |
| 2,659,773 | Barney | Nov. 17, 1953 |
| 2,731,512 | Levy | Jan. 17, 1956 |
| 2,745,038 | Sziklai | May 8, 1956 |
| 2,774,822 | Dunlap et al. | Dec. 18, 1956 |
| 2,870,259 | Norris | Jan. 20, 1959 |